United States Patent [19]

Nash

[11] Patent Number: 5,740,936

[45] Date of Patent: Apr. 21, 1998

[54] ELECTRIC OUTLET BOX ASSEMBLY

[76] Inventor: William L. Nash, 4069 NE. 8th Ave., Oakland Park, Fla. 33334

[21] Appl. No.: 754,027

[22] Filed: Nov. 20, 1996

[51] Int. Cl.⁶ .................................................. H02G 3/08
[52] U.S. Cl. ........................................ 220/3.3; 220/3.92
[58] Field of Search ............................ 220/3.2, 3.3, 3.4, 220/3.9, 3.92

[56] References Cited

U.S. PATENT DOCUMENTS

| | | | |
|---|---|---|---|
| 2,959,633 | 11/1960 | Palmer et al. | 220/3.2 |
| 3,601,276 | 8/1971 | Culpepper | 220/3.4 |
| 4,135,337 | 1/1979 | Medlin | 220/3.92 |
| 4,389,535 | 6/1983 | Slater et al. | 220/3.2 |
| 4,399,922 | 8/1983 | Horsley | 220/3.3 |
| 4,569,458 | 2/1986 | Horsley | 220/3.9 |
| 4,605,139 | 8/1986 | Dacar | 220/3.4 |
| 5,378,854 | 1/1995 | Hoover . | |

*Primary Examiner*—Stephen J. Castellano

*Attorney, Agent, or Firm*—Herbert L. Lerner; Laurence A. Greenberg

[57] ABSTRACT

An electrical outlet box assembly to be installed on a masonry structure between furring strips for mounting thereon a wall finishing board, has a main housing member. The main housing member is formed of a generally flat back plate and side walls extending orthogonally away from the back plate. A cover top is mounted to the main housing member. The cover top is formed of a wall finishing support top, for receiving a wall finishing board, and riser walls extending orthogonally away from the wall finishing support top. The riser walls have an electrical device cavity formed therein for receiving an electrical device. The main housing side wall has a given first height and the wall finishing support top has a thickness, together corresponding to a thickness of a furring strip. The riser wall has a given second height corresponding to a width of the wall finishing board for facilitating installation of the wall finishing board when the main housing member is placed between furring strips on a masonry wall.

8 Claims, 3 Drawing Sheets

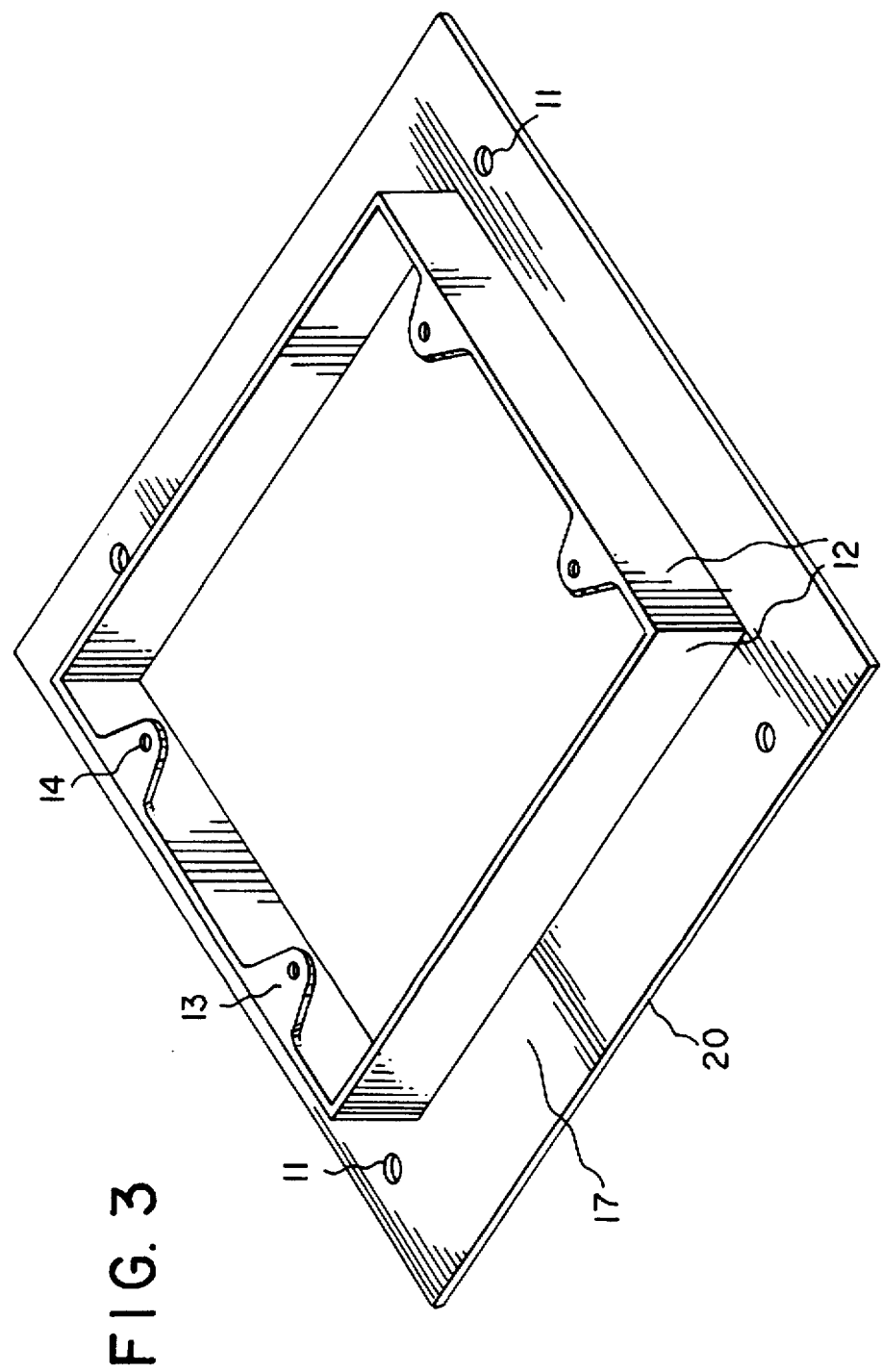

1

ELECTRIC OUTLET BOX ASSEMBLY

BACKGROUND OF THE INVENTION

1. Field of the Invention

The invention relates to an outlet box for electrical outlets. The outlet box is mounted on masonry walls (e.g. concrete) between furring strips for mounting thereon drywall or sheetrock. The box, at its lateral openings, receives non-metallic cable (e.g. ROMEX).

2. Description of the Related Art

Standard outlet boxes which are currently available in commerce are a minimum of 1½ to 2" (3.9–5.2 cm) deep. Furring strips, which define the distance between the concrete wall and the wall finish (e.g. drywall), generally have a thickness of only ¾" (1.9 cm). Accordingly, it is necessary to chisel recesses or holes into the concrete structure, so as to allow the proper placement of the outlet box and to provide a recessed path for the non-metallic cable such that the cable is aligned with the knock-outs of the outlet box. The object of the prior art device is to align the outer flange of the outlet box with the outer surface of the furring strip. A raised mud ring plate is then placed on the outlet box to provide a device mounting capability which is flush with the wall finish (e.g. drywall). After the box has been properly mounted, the concrete wall is patched around the box to fill the void in the concrete wall. The quicker and easier it is to install and connect a particular outlet box, the more desirable that outlet box is to the electrical contractor.

U.S. Pat. No. 5,378,854 to Hoover discloses a plastic outlet box. The outlet box taught by Hoover is a box for attachment to a stud, which is deeper than furring strips. If utilized in the context of furred walls, the Hoover box is so deep as to require the above-described chipping of a void in the concrete wall.

U.S. Pat. No. 4,135,337 to Medlin discloses another example of an outlet box. The outlet box taught by Medlin is a box for attachment to a metal stud, which is deeper than furring strips. If utilized in the context of furred walls, the Medlin box is so deep as to require the above-described chipping of a void in the concrete wall.

SUMMARY OF THE INVENTION

It is accordingly the object of the invention to provide an electrical outlet box which overcomes the herein-mentioned disadvantages of the heretofore-known devices and makes it possible to install the outlet box without having to chisel out the concrete wall and plaster the voids when the outlet box is installed.

With the foregoing and other objects in view there is provided, in accordance with the invention, an electrical outlet box assembly to be installed on a masonry structure between furring strips for mounting thereon a wall finishing board, the assembly comprising a main housing member. The main housing member is formed of a generally flat back plate and side walls extending orthogonally away from the back plate. A cover top is mounted to the main housing member. The cover top is formed of a wall finishing support top, for receiving a wall finishing board, and riser walls extending orthogonally away from the wall finishing support top. The riser walls have an electrical device cavity formed therein for receiving an electrical device. The side wall has a given first height and the wall finishing support top has a thickness, together, corresponding to a thickness of a furring strip. The riser wall has a given second height corresponding to a width of the wall finishing board for facilitating installation of the wall finishing board when the main housing member is placed between furring strips on a masonry wall.

In accordance with an added feature of the invention, the main housing member is integrally formed of injection-molded PVC.

In accordance with an additional feature of the invention, the cover top is integrally formed of injection-molded PVC.

In accordance with another feature of the invention, the side walls of the main housing member have butterfly tabs formed thereon for selectively introducing non-metallic cable into the main housing member.

In accordance with a concomitant feature of the invention, the main housing member has reinforcing webs attached to the side walls for providing structural integrity to the main housing member.

In accordance with an added feature of the invention, the cover top has device tabs and the device tabs have threaded device tab mounting holes formed therein for securing the electrical device to the cover top.

In accordance with an additional feature of the invention, the main housing member and the cover top are integrally formed of injection-molded PVC.

In accordance with another feature of the invention, the main housing member and the cover top are integrally formed of metal.

The invention is illustrated with a one and two device electrical outlet box. The invention is applicable to an electrical outlet box containing multiple devices.

Other features which are considered as characteristic for the invention are set forth in the appended claims.

Although the invention is illustrated and described herein as embodied in an electrical outlet box assembly for electrical devices, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 3 is a perspective view of a two device top plate.

DESCRIPTION OF THE PREFERRED EMBODIMENTS

Figure 1:
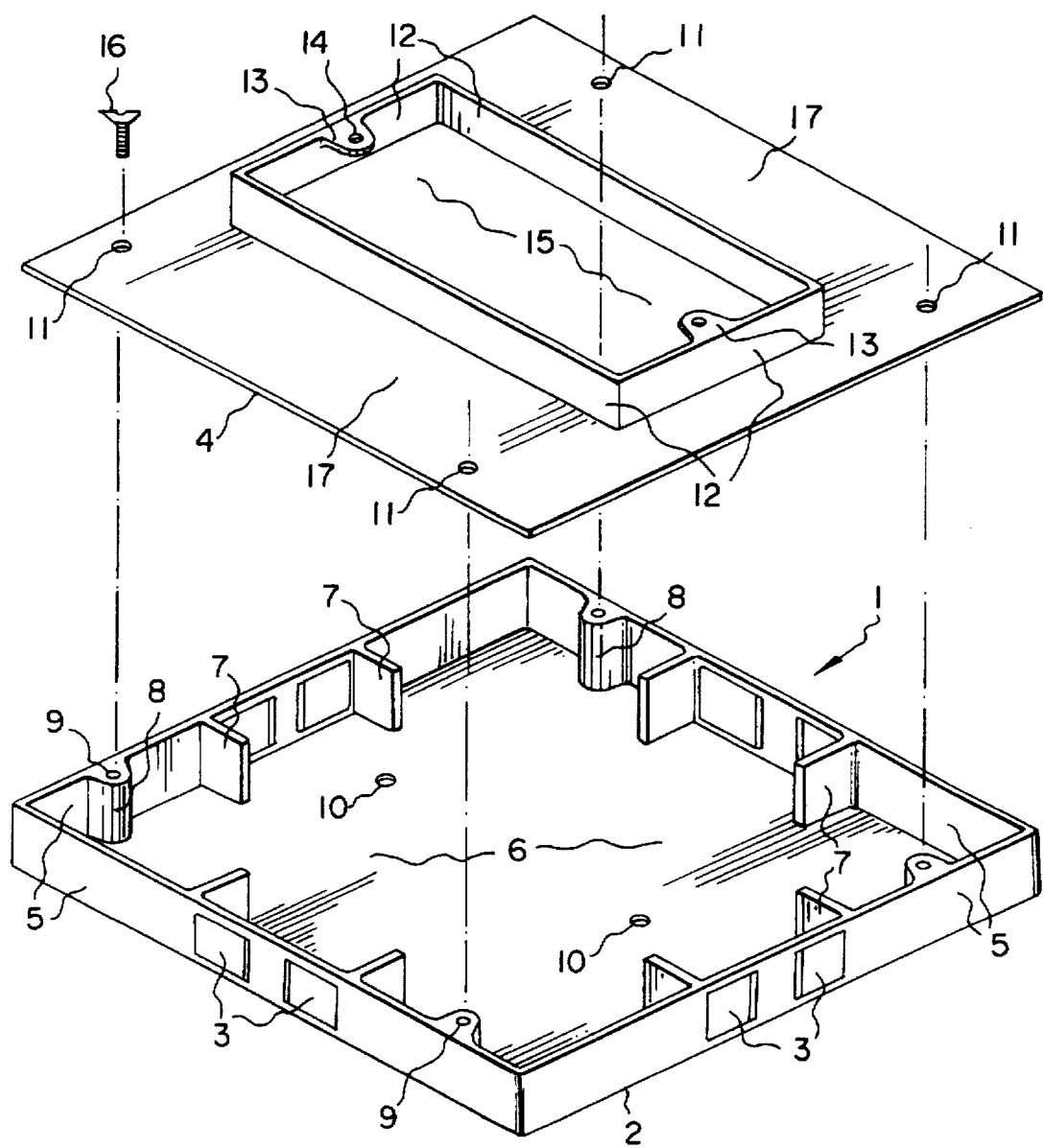
FIG. 1 is a diagramatic, exploded, front top perspective view of two components of an electrical outlet box assembly according to the invention.

Referring now to the figures of the drawing in detail and first, particularly, to FIG. 1 thereof, there is shown an electrical outlet box 1 with a main housing member 2 as well as butterfly tabs 3, and a one device cover top 4 which may be formed of injected-molded PVC or metal. The housing 2 is further defined by side walls 5, a back plate 6, multiple reinforcing webs 7, multiple cover top mounting nodes 8 formed into the side walls 5, and multiple threaded cover top mounting holes 9, formed in the cover top mounting nodes 8, for receiving fasteners such as screws.

The back plate 6 is generally flat and has multiple mounting holes 10 for mounting the electrical outlet box 1 to a non-illustrated masonry structure. The electrical outlet box 1 is shown in a generally square shape but can be formed into any desirable shape.

The reinforcing webs 7 are disposed at the entry location of the double butterfly tabs 3. The webs 7 are formed on the back plate 6 and the side walls 5. The webs 7 provide structural integrity to the electrical outlet box 1.

The butterfly tabs 3, provided in each of the side walls 5, are bendable on one side to allow the butterfly tab 3 to be pushed angularly into the electrical outlet box 1 with the insertion of a non-metallic cable (not shown). The non-metallic cable is pinned between the butterfly tabs 3 and the reinforcing webs 7. The butterfly tabs 3 are essentially weakened flaps.

The one device cover top 4 is further defined by multiple cover top holes 11 for accommodating a fastener 16 to fasten the one device cover top 4 to the housing 2. The fastener 16 locks with the threaded cover top mounting holes 9. The one device cover top 4 has a wall finishing support top 17 for receiving a wall finishing board 19 as shown in FIG. 2.

The one device cover top 4 has multiple riser walls 12, multiple device tabs 13, multiple threaded device tab mounting holes 14 and an electrical device cavity 15. A non-illustrated electrical device is placed into the device cavity 15 and is secured to the device tabs 13 by a non-illustrated fastener locked to the threaded device tab mounting holes 14. The threaded device tab mounting holes 14 are generally 3¼" apart to accommodate standard size electrical devices. The electrical outlet box 1 could be modified to accommodate different sized devices.

Figure 2:
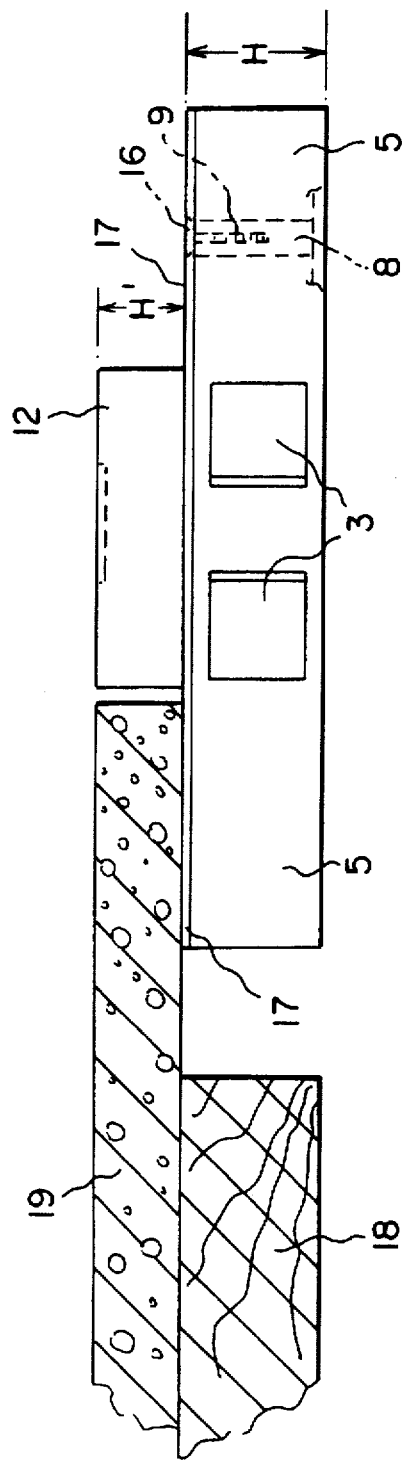
FIG. 2 is a side-elevation view of the electrical outlet box residing next to a furring strip and mounting a piece of wall finishing board.

FIG. 2 shows that side wall 5 and the wall finishing support top 17 define a height H such that they fit flushly with a furring strip 18. The riser wall 12 is dimensioned to a height or width H' such that it fits flushly with the wall finishing board 19 when the wall finishing board 19 is sitting on the wall finishing support top 17. In the preferred application, the depth of H+H' is 1¼" (3.175 cm), whereby the dimension H is ¾" (1.9 cm) which corresponds to the thickness of the furring strip, and the dimension H' is ½" (1.27 cm) which corresponds to the thickness of the wall finishing board. The dimensions of the outlet box (1) can be changed to accommodate changes in the dimension of the furring strip (18) or the wall finishing board (19).

FIG. 3 shows a two device mounting cover top 20. The electrical outlet box 1 can be modified to accept a 3, 4, 5, etc. device mounting cover top.

I claim:

1. An electrical outlet box assembly to be installed on a masonry structure between furring strips for mounting thereon a wall finishing board, the assembly comprising:

a main housing member being formed of a generally flat back plate and side walls extending orthogonally away from said back plate;

a cover top mounted to said main housing member, said cover top being formed of a wall finishing support top, for receiving a wall finishing board, and riser walls extending orthogonally away from said wall finishing support top;

said riser walls having an electrical device cavity formed therein for receiving an electrical device; and said side wall having a given first height and said wall finishing support top having a thickness, together corresponding to a thickness of a furring strip, said thickness of said furring strip being less than 1½ inches, and said riser wall having a given second height corresponding to a width of the wall finishing board for facilitating installation of the wall finishing board when said main housing member is placed between furring strips on a masonry wall.

2. The outlet box according to claim 1, wherein said main housing member is integrally formed of injection-molded PVC.

3. The outlet box according to claim 1, wherein said cover top is integrally formed of injection-molded PVC.

4. The outlet box according to claim 1, wherein said side walls of said main housing member have butterfly tabs formed thereon for selectively introducing non-metallic cable into said main housing member.

5. The outlet box according to claim 1, wherein said main housing member has reinforcing webs, attached to said side walls, for providing structural integrity to said main housing member.

6. The outlet box according to claim 1, wherein said cover top has device tabs, said device tabs having threaded device tab mounting holes formed therein for securing the electrical device to said cover top.

7. The outlet box according to claim 1, wherein said main housing member and said cover top are integrally formed of injection-molded PVC.

8. The outlet box according to claim 1, wherein said main housing member and said cover top are integrally formed of metal.

* * * * *